3,164,578
RECOVERY PROCESS FOR POLYOLEFINS
Bertsil Burgess Baker, West Chester, Pa., and Kenneth Martin Brauner, Grendon Farms, and Alan Norton Oemler, Highland Woods, Del., assignors to E. I. du Pont de Nemours and Company, Wilmington, Del., a corporation of Delaware
No Drawing. Filed July 26, 1962, Ser. No. 212,715
10 Claims. (Cl. 260—94.9)

This invention relates to an improved method for purifying hydrocarbon polymers produced by the polymerization of a terminally unsaturated olefin by means of coordination polymerization catalysts which are formed by admixing a halide of a transition element with a metal-containing reducing agent, such as an organometallic compound, a metal hydride, or an active metal.

Catalysts which are prepared by reacting compounds, preferably halides, of transition elements of Groups IV-B, V-B, and VI-B of the Periodic Chart of the Elements, such as may be found on pages 448-9 of the Handbook of Chemistry and Physics, 41st edition, 1959, and especially titanium, vanadium, and zirconium from the aforesaid groups, with metallic reducing agents, such as metal alkyls, metal hydrides and alkali metals, are extremely active polymerization catalysts which will polymerize ethylene at low pressures and temperatures to an essentially linear, high molecular weight polymer. These catalysts have been referred to as coordination polymerization catalysts since it is believed that the reduced transition element forms coordinate bonds with ethylene and causes the polymerization of ethylene to linear polymers having unique properties. The activity of coordination polymerization catalysts is such that they may be employed to polymerize terminally unsaturated olefinic hydrocarbons, especially those containing 2-18 carbon atoms, to high molecular weight solids which are useful as plastics.

The process employed to polymerize terminally unsaturated hydrocarbons with coordination polymerization catalysts may be carried out over a wide range of conditions. Thus, reaction temperatures may be varied from below 0° C. to above 250° C. and pressures may be varied from atmospheric pressure to pressures exceeding 1000 atmospheres. Generally, the polymerization is carried out in the presence of an inert, liquid, hydrocarbon medium containing the catalyst.

The coordination polymerization catalysts have the disadvantage of leaving metallic residues intimately admixed with and possibly bonded to the polymer. If these catalyst residues are not removed, degradation and discoloration of the polymer will occur when it is heated. Such degradation and discoloration are undesirable where the polymers are melt fabricated and it is, therefore, necessary to remove the metallic catalyst residues as completely as possible. Furthermore, the catalyst residues retained in the polymer will cause corrosion of the process equipment employed in the fabrication of the polymer. It heretofore has been found that alcoholysis of the polymer obtained with coordination polymerization catalysts will cause the breaking of the metal-to-polymer bond with resultant solubilization of the metal. It, likewise, has been known that the metallic catalyst residues obtained in the polymerization of ethylene can be solubilized by reacting with a suitable chelating agent.

It is an object of the present invention to provide a process for the removal of coordination polymerization catalysts from polymers of terminally unsaturated olefinic hydrocarbons. It is a further object to provide a means of retarding polymer degradation and color formation in these polymers during melt-processing and a means of retarding corrosion in the process equipment. It is a further object to provide a process which is economically feasible. Other objects will become apparent hereinafter.

In accordance with the present invention, it has been discovered that metallic catalyst residues obtained in the polymerization of terminally unsaturated olefins can be effectively solubilized by a process which comprises reacting at a temperature of at least 125° C. a suitable fatty acid with the polymerization mixture comprising a liquid hydrocarbon medium, a dissolved hydrocarbon polymer and a metallic catalyst residue containing a transition element, the quantity of said fatty acid being sufficient to convert the metallic residue to soluble components, and then contacting said reaction mixture at a temperature of at least 125° C. with an adsorbent selected from the class consisting of silica and alumina. In a specific embodiment of the present invention, the process is carried out in a continuous manner wherein the polymer solution is reacted with a suitable fatty acid and then contacted with the adsorbent. The latter is thereafter regenerated with steam at elevated temperatures before being recontacted with more polymer solution. In this manner, the catalyst residue obtained from the polymerization of terminally unsaturated olefinic hydrocarbons with a coordination polymerization catalyst may be readily removed from a solution of the polymer in hydrocarbon by adsorption on a silica or alumina adsorbent. Although the process of the present invention is hereinafter described principally in terms of an ethylene polymerization process, it is equally well applicable to a process for the polymerization and copolymerization of terminally unsaturated hydrocarbons in general, and especially those olefinic hydrocarbons containing 2-18 carbon atoms, since the mechanism of polymer formation and catalyst removal is the same. Particularly useful in the present invention are polymers of ethylene, i.e. polymers which are formed solely from ethylene or from mixtures of ethylene and one or more comonomers.

The catalyst residues removed by the process of the present invention are those obtained from the polymerization of ethylenically unsaturated compounds with a catalyst formed by admixing a compound, preferably a halide, of a transition element selected from Groups IV-B, V-B, and VI-B of the Periodic Chart of Elements with an organometallic reducing agent wherein the metal is selected from Groups I to III of the Periodic Chart of Elements and wherein the organic radical is a hydrocarbon radical. In place of the organometallic reducing agent, metal hydrides and alkali metals, also, may be employed as reducing agents.

The polymerization of ethylene with a catalyst comprising the product formed from the reaction of a transition metal halide, such as a titanium, vanadium or zirconium halide, with a metallic reducing agent, such as a metal alkyl or metal aryl, a Grignard reagent, a metal hydride or an alkali metal, is extremely facile and may be carried out over a wide range of conditions. The preferred process, however, is one in which the polymer is formed as a solution in the inert hydrocarbon reaction medium. The polymer becomes sufficiently soluble in the hydrocarbon medium if the temperature is maintained above the melting point of the polymer, that is, above approximately 120° C. Such a process allows good control over the polymerization and provides a product of high quality. Although the present invention is especially adapted to such a process, it also, may be applied to processes in which the polymerization is carried out at temperatures below the dissolution point of the polymer, but an additional step of heating the polymerization product until a solution of the polymer is achieved is required.

The product obtained from the polymerization of ethylene with a coordination polymerization catalyst at temperatures above about 120° C. in the presence of an inert liquid hydrocarbon comprises the inert liquid hydrocarbon, dissolved unreacted monomer, dissolved polymer and the catalyst residue which may exist in the form of an insolusoluble complex or as part of the polymer by being chemically bonded thereto. It has been found that fatty acids will react with the insoluble and/or bonded catalyst residues to form soluble products. This reaction will go essentially to completion if the polymer is kept in solution, and preferably at temperatures of 125 to 300° C. The quantity of the fatty acid necessary to achieve the solubilization should be at least the stoichiometric quantity necessary to form metal salts with the metal compounds of the catalyst. This quantity is readily calculated if the quantity of catalyst added to effect the polymerization is known. At the temperatures necessary to maintain the polymer in solution, the solubilization reactions occur rapidly and, therefore, only stoichiometric quantities of the fatty acid are necessary. In general, however, it is preferred to employ quantities in excess of the stoichiometric quantity of the fatty acid necessary to solubilize the metals. Exceedingly large quantities of the fatty acid should be avoided since such large quantities may cause precipitation of the polymer. However, within the range necessary to achieve solubilization of the inorganic catalyst residues, the fatty acids are readily compatible with the polymer solution and no precipitation of the polymer occurs at the temperatures employed.

The fatty acids useful herein may be any fatty acid which reacts with and solubilizes the metallic residue of the catalyst. In the present invention, it has been found that fatty acids containing at least 4 carbon atoms, preferably those containing 4-30 carbon atoms, may be employed. Examples of the preferred acids include lauric, stearic and oleic acids as well as naturally occurring materials, such as the coconut fatty acids.

Ethylene dissolved in the polymerization mixture is not detrimental to the process of the present invention but is thought to be beneficial in that the ethylene is believed to react with the halogen acids resulting from the reaction of the metallic residues with the fatty acid. The resultant ethyl halide is readily removable with the solvent and does not deleteriously affect the polymer.

The polymer solution obtained after addition of the fatty acid is contacted at temperatures sufficient to maintain the polymer in solution, i.e. temperatures of at least about 125° C., preferably at temperatures of 125-300° C., with an adsorbent selected from the class consisting of alumina and silica. It has been discovered that at the temperatures employed the solubilized metal residues are essentially completely adsorbed by the silica or alumina. It is, of course, necessary to maintain the polymer in solution to successfully separate the catalyst residues from the polymer. The silica or alumina employed is readily regenerated by contacting the alumina or silica containing adsorbed, solubilized, catalyst residues with steam at a temperature of 250° C. The efficiency of adsorption of solubilized catalyst residues increases with the surface area of the adsorbent, and thus a small particle size is preferred. The adsorption may be carried out in a fixed bed or a moving bed and by various other means known to those skilled in the art. The contact time of the polymer solution with the adsorbent is not critical the adsorption being very rapid.

The treated polymer solution is essentially free from inorganic residues and contains principally polymer and residual monomer in solvent. The polymer may be separated from the solution by distilling off the solvent and monomer, leaving the molten polymer as a residue. The molten polymer may be cooled or fed into a melt extruder to be converted into any desirable shape, such as sheets, ribbons or rods. Alternate methods of polymer separation comprise the addition of liquids, such as methanol, in sufficient quantities, generally from 30-50% by weight of the polymer solution, to cause precipitation of the high molecular weight polymer. The precipitated polymer, hydrocarbon solvent and precipitant are passed into a settler maintained at a temperature above the melting point of the polymer. The molten polymer settles and can be removed continuously at the bottom while solvent and precipitant are removed from the top.

The process of the present invention is carried out at temperatures ranging from 125–300° C. Since the hydrocarbon solvents employed as polymerization media, for example, cyclohexane, n-decane, benzene and toluene, have boiling points which are below the temperature employed in the purification of the polymer, it is necessary to operate the process under sufficient positive pressure to maintain the hydrocarbon solvent in the liquid phase. The minimum pressures required will vary with the solvents employed. Beyond the pressure necessary to maintain the solvent in the liquid phase, the pressure is not critical. Generally, it has been found that pressures in the range of 1,000 p.s.i. to 3,000 p.s.i. are well suited to maintain the solvents employed in the liquid phase. If desired in the present invention, a metal chelating agent, such as described in U.S. Patent 2,978,442, issued April 4, 1961, to Brightbill et al., also, may be added to facilitate solubilization of the catalyst residue.

The process of the present invention is further illustrated by the following examples which in no way limit the invention.

*Example I*

Into a continuous reactor equipped with an efficient, flat blade stirrer is charged 43 pounds/hour of cyclohexane, 6.7 milligram moles/hour of a 4:1 mixture of titanium tetrachloride and vanadium oxytrichloride, 11.9 milligram moles/hour of aluminum triisobutyl, and 4.3 pounds/hour of ethylene. The temperature of the reactor is maintained at 250° C. and the pressure at 2,500 p.s.i. A 10% polymer solution is obtained. The reactor discharge is passed through a pressure letdown valve, which reduces the pressure from 2500 to 1300 p.s.i., into a mixing vessel maintained at a temperature of 210–220° C. Into the reactor discharge just prior to entering the mixing vessel is injected 5.24 grams/hour of oleic acid. The polymer solution is passed from the mixing vessel into a 52 inch adsorption column having a diameter of 2.875 inches and containing 8.2 pounds of 14–20 mesh silica at the rate of 58 pounds/hour. The column is kept at a pressure of 1300 p.s.i. and at a temperature of 217° C. The pressure drop across the column is approximately 100 p.s.i.

The solvent is flashed off from the treated solution and molten polyethylene is obtained. The polymer is found to have less than 8 parts/million of inorganic ash. The removal of metallic catalyst residues is 99% efficient.

*Example II*

Into a continuous reactor equipped with an efficient, flat-blade stirrer is charged continuously in one hour 50 pounds of benzene, 15 milligram moles of a 4:1 titanium tetrachloride-vanadium oxytrichloride mixture, 25.2 milligram moles of aluminum triisobutyl, and 5.0 pounds of ethylene. The reactor pressure is maintained at 2250 p.s.i. and the temperature at 238° C. From the reactor there is obtained a 3.3% solution of polymer in benzene. The reactor discharge is passed through a pressure letdown valve, which reduces the pressure to 1350 p.s.i., into a mixing vessel to which is added 11.3 grams/hour of oleic acid. The treated mixture is then passed through a 5 foot long, 25 inch diameter adsorption column containing 8–14 mesh alumina which has been regenerated by a water treatment. The adsorption column is maintained at a pressure of 1350 p.s.i. and a temperature of 204° C. After passing through the column, solvent is flashed off and molten polymer is obtained. The polymer is found to contain 40 parts/million of inorganic ash.

*Example III*

A 7.2% copolymer solution in benzene is prepared by reacting 2.54 pounds of ethylene with 3.12 pounds of butene-1 in 21 pounds of solvent employing as a catalyst the reaction products from 2.8 milligram moles of a mixture of titanium tetrachloride and vanadium oxytrichloride and 7.9 milligram moles of aluminum triisobutyl. The polymer solution is passed into a mixing vessel maintained at a pressure of 1400 p.s.i. and 211° C. and 3.02 grams of oleic acid in 2.1 pounds of solvent is added. The resulting solution is passed through a 4 foot long, 1.25 inch diameter column containing 14–20 mesh silica gel. The recovered copolymer of butene-1 and ethylene is found to have an inorganic ash content of 50 parts/million, representing a 94% removal of the catalyst.

*Example IV*

A 6.9% copolymer solution in cyclohexane is prepared by polymerizing 2.2 pounds of ethylene with 0.85 pound of decene-1 in 27 pounds of cyclohexane employing as the catalyst the product formed from reacting 6.9 milligram moles of a 4:1 titanium tetrachloride, vanadium oxytrichloride mixture with 10.8 milligram moles of aluminum triisobutyl. The polymer solution is passed into a mixing vessel maintained at a pressure of 1300 p.s.i. and a temperature of 211° C. and 5.0 grams of oleic acid in 2.2 pounds of solvent is added. The resulting solution is passed into a 2 inch diameter, 5 foot long column containing 8–14 mesh activated alumina. The polymer, on separation from the solvent, is found to have an inorganic ash content of 70 parts/million, representing a 94% removal of the catalyst.

*Example V*

A 4.1% polymer solution is obtained by polymerizing 6.5 pounds of ethylene in 50 pounds of cyclohexane employing a catalyst formed from 45 milligram moles of titanium tetrachloride and 44 milligram moles of lithium aluminum tetradecyl. The resulting polymer solution is passed into a mixing vessel maintained at a pressure of 1300 p.s.i and a temperature of 211° C. To this polymer solution 37.5 grams of oleic acid in 10 pounds of solvent is added. The resulting solution is passed through a 2 inch diameter, five foot long column containing 8–14 mesh silica. The polymer obtained on separation from the solvent is found to have an inorganic ash content of 90 parts/million, representing a 98.5% removal of the catalyst.

It is to be understood that the above examples are given for the purpose of illustrating the present invention only, and that numerous variations of the foregoing examples are possible without departing from the scope of the invention.

The process of the present invention is useful in the preparation of hydrocarbon polymers which are substantially free from inorganic catalyst residues, where the polymerization involves the use of organometallic catalysts containing a transition metal in a reduced valence state.

The purified hydrocarbon polymers obtained by using the process of the present invention are greatly improved in stability and color. On melt extrusion and injection molding of hydrocarbon polymers purified by the present invention, color-free products are obtained. Furthermore, the polymers may be maintained in the molten state for long periods of time without being degraded or discolored. The corrosion of process equipment employed in the fabrication of hydrocarbon polymers purified by the present invention is reduced to a minimum.

We claim:

1. A process for removing metallic catalyst residues from a polymer of a terminally unsaturated olefin obtained on polymerizing said terminally unsaturated olefin in an inert liquid hydrocarbon with a catalyst formed by admixing a halide selected from the group consisting of titanium halides and vanadium halides with a compound of aluminum having an aluminum to hydrocarbon bond which comprises reacting at a temperature of at least 125° C. a fatty acid with a polymerization mixture containing said polymer dissolved in said inert liquid hydrocarbon and a residue of said catalyst, the quantity of said fatty acid being at least stoichiometric with the metals of said catalyst residue, thereafter contacting the mixture at a temperature of at least 125° C. with an adsorbent selected from the group consisting of silica and alumina, and recovering a polymer solution essentially free of metallic catalyst residues.

2. The process as set forth in claim 1 wherein the polymer is a polymer of ethylene.

3. The process as set forth in claim 1 wherein the fatty acid contains 4–30 carbon atoms.

4. The process as set forth in claim 1 wherein the catalyst is the product formed by admixing a titanium halide with an organometallic aluminum-hydrocarbon compound.

5. The process as set forth in claim 1 wherein the catalyst is the product formed by admixing a titanium halide and a vanadium halide with an organo-metallic aluminum-hydrocarbon compound.

6. The process as set forth in claim 1 wherein the liquid hydrocarbon is cyclohexane.

7. The process as set forth in claim 1 wherein the fatty acid is oleic acid.

8. A process for removing metallic catalyst residues from a polymer of a terminally unsaturated olefin obtained on polymerizing said terminally unsaturated olefin in an inert liquid hydrocarbon with a catalyst formed by admixing a halide selected from the group consisting of titanium halides and vanadium halides with a compound of aluminum having an aluminum to hydrocarbon bond which comprises reacting at a temperature of at least 125° C. a fatty acid and a metal chelating agent with a polymerization mixture containing said polymer dissolved in said inert liquid hydrocarbon and a residue of said catalyst, the quantity of said fatty acid being at least stoichiometric with the metals of said catalyst residue, thereafter contacting the mixture at a temperature of at least 125° C. with an adsorbent selected from the group consisting of silica and alumina, and recovering a polymer solution essentially free of metallic catalyst residues.

9. The process which comprises introducing a fatty acid into a polyethylene polymerization mixture at a temperature of 125–300° C., said polymerization mixture obtained on polymerizing in an inert liquid hydrocarbon ethylene with a catalyst formed by admixing a titanium halide with a compound of aluminum having an aluminum to hydrocarbon bond, the quantity of said fatty acid being at least equimolar to said titanium and aluminum, maintaining the resulting mixture at a temperature of 125–300° C. under a pressure of at least 1000 p.s.i. while contacting with an adsorbent selected from the group consisting of alumina and silica, and recovering a polymer solution essentially free of metallic catalyst residues.

10. The process which comprises introducing a fatty acid into a polyethylene polymerization mixture at a temperature of 125–300° C., said polymerization mixture obtained on polymerizing in an inert liquid hydrocarbon ethylene with a catalyst formed by admixing a mixture of halides of titanium and vanadium with a compound of aluminum having an aluminum to hydrocarbon bond, the quantity of said fatty acid being at least equimolar to said titanium, vanadium and aluminum, maintaining the resulting mixture at a temperature of 125–300° C. under a pressure of at least 1000 p.s.i. while contacting with an adsorbent selected from the group consisting of alumina and silica, and recovering a polymer solution essentially free from metallic catalyst residues.

References Cited in the file of this patent

UNITED STATES PATENTS

| | | |
|---|---|---|
| 2,827,445 | Bartolomeo et al. | Mar. 18, 1958 |
| 2,978,442 | Brightbill et al. | Apr. 5, 1961 |

OTHER REFERENCES

Bibliography of Solid Adsorbents, 1943–1953, paragraph 8977, U.S. Dept. of Commerce (1956).